(12) United States Patent
Rauscher et al.

(10) Patent No.: US 9,829,130 B2
(45) Date of Patent: Nov. 28, 2017

(54) ADAPTER AND TURBOMACHINE

(71) Applicant: MTU Aero Engines AG, Munich (DE)

(72) Inventors: Stefan Rauscher, Aichach (DE); Christoph Lauer, Munich (DE)

(73) Assignee: MTU AERO ENGINES AG, Munich (DE)

( * ) Notice: Subject to any disclaimer, the term of this patent is extended or adjusted under 35 U.S.C. 154(b) by 487 days.

(21) Appl. No.: 14/284,157

(22) Filed: May 21, 2014

(65) Prior Publication Data

US 2014/0346768 A1    Nov. 27, 2014

(30) Foreign Application Priority Data

May 22, 2013    (EP) .................................... 13168642

(51) Int. Cl.
    *F01D 9/02*    (2006.01)
    *F16L 23/02*   (2006.01)
    *F01D 9/06*    (2006.01)

(52) U.S. Cl.
    CPC .............. *F16L 23/02* (2013.01); *F01D 9/02* (2013.01); *F01D 9/06* (2013.01); *F05D 2240/128* (2013.01); *Y02T 50/671* (2013.01)

(58) Field of Classification Search
    CPC ....... F16L 23/02; F16L 23/032; F16L 23/036; F16L 23/14; F16L 23/028; F16L 23/0286; F16L 25/0018; F16L 43/003; F16L 41/08; F16L 41/086; F16L 41/14
    USPC ......... 224/545, 557; 248/65, 71, 73, 220.21, 248/223.41, 231.91
    See application file for complete search history.

(56) References Cited

U.S. PATENT DOCUMENTS

| | | | | |
|---|---|---|---|---|
| 2,124,541 | A | * | 7/1938 | Cassey .................... H02G 3/10 220/3.9 |
| 4,643,458 | A | * | 2/1987 | Ammar ............... F01N 13/1805 180/296 |
| 8,944,149 | B2 | * | 2/2015 | Zhou .................. H01L 23/4006 165/185 |
| 2002/0150466 | A1 | | 10/2002 | Letourneau |
| 2003/0178458 | A1 | * | 9/2003 | Trambley .................. B60R 9/04 224/326 |
| 2008/0023604 | A1 | * | 1/2008 | Bottomley ......... A47B 47/0008 248/223.41 |
| 2008/0142658 | A1 | * | 6/2008 | Jurja .................. A47B 21/0314 248/220.21 |

(Continued)

FOREIGN PATENT DOCUMENTS

| | | |
|---|---|---|
| DE | 1 042 606 B | 11/1958 |
| FR | 2 736 088 A1 | 1/1997 |
| FR | EP 0752553 A1 * | 1/1997 ............ F16L 23/032 |

OTHER PUBLICATIONS

European Search Report issued in European counterpart application No. 13168642.0-1610 dated Oct. 9, 2013, with Statement of Relevancy (Five (5) pages).

*Primary Examiner* — David E Bochna
*Assistant Examiner* — James A Linford
(74) *Attorney, Agent, or Firm* — Crowell & Moring LLP

(57) ABSTRACT

An adapter for connecting a fluid line to a housing section of a turbomachine is disclosed. A lower and an upper pair of flanges are arranged offset from each other about a channel axis of a fluid channel and are arranged without a space between each other in a direction of the channel axis, where the feed-throughs of the upper pair of flanges are open circumferentially.

9 Claims, 3 Drawing Sheets

(56) References Cited

U.S. PATENT DOCUMENTS

| | | | |
|---|---|---|---|
| 2009/0206218 A1* | 8/2009 | Massey | B60B 7/02 248/220.21 |
| 2010/0108838 A1* | 5/2010 | DeMartine | F16M 13/022 248/222.14 |
| 2011/0248130 A1* | 10/2011 | Salice | E05F 5/006 248/220.21 |

* cited by examiner

ADAPTER AND TURBOMACHINE

This application claims the priority of European Patent Application No. EP 13168642.0, filed May 22, 2013, the disclosure of which is expressly incorporated by reference herein.

BACKGROUND AND SUMMARY OF THE INVENTION

The invention relates to an adapter for connecting a fluid line to a housing portion of a turbomachine and a turbomachine.

A known adapter for connecting a fluid line to a housing section of a turbomachine such as a gas turbine and in particular an aircraft engine includes a core housing in which a fluid channel is formed for establishing fluid communication between the fluid line and a housing inlet. For fastening the adapter to the housing portion and the connection of a connecting element of the fluid line, an upper pair of flanges and a lower pair of flanges extend from the core housing which, relative to the channel axis, have the same orientation, and are thus arranged almost congruently one above the other. Due to the one-over-the-other arrangement of the pairs of flanges, a minimum distance between the pairs of flanges is required in order to position fasteners such as screws or nuts for securing the adapter to the housing or to connect the piping connection element to the adapter.

In U.S. Patent Application Publication No. 2002/0150466 A1, an adapter for connection of a fluid line to a housing portion of a turbomachine is shown having a flange in the form of a bottom flange for fastening the adapter to the housing portion and a flange in the form of a top annular flange for attachment of a piping connection element. For the positioning of the fastener into feed-throughs of the flange, the flange plate and the annular flange are spaced apart from each other in the direction of the channel axis.

The object of the invention is to provide an adapter for connecting a fluid line to a housing section of a turbomachine, which eliminates the aforesaid drawbacks and has a reduced overall height. Furthermore, the object of the invention is to create a turbomachine with tightly or closely guided fluid lines along its housing.

An adapter according to the invention for connecting a fluid line to a housing section of a turbomachine has a core housing in which fluid communication is created between the fluid line and a housing inlet, and flanges, each having feed-throughs for passage of a fastener. According to the invention at least two flanges form a lower pair of flanges for securing the adapter to the housing portion and at least two flanges form an upper pair of flanges for connecting a fluid line connection piece to the adapter. The pairs of flanges are offset about the channel axis to one another and arranged in the direction of the channel axis with no spacing from one another. In addition, the feed-throughs of the upper pair of flanges are open circumferentially.

By the offset of the flange pairs about the channel axis and the rotation of the pairs of flanges to each other and the direct arrangement over each other or one going into the other, the adapter is distinguished from the other previously described adapters by a reduced overall height, as no space is required for positioning of the fastener or fastener part between the flanges. The required free space is created by lateral twisting of the lower flange pair. By the upper feed-throughs being open circumferentially, fasteners such as screws for connecting to the fluid line can be used at all times and in particular also retrospectively, meaning after the adapter has been secured to the housing section. Due to the small spacing of the upper pair of flanges from the housing section it then acts as a kind of limit on the loose fasteners before they are fitted. By subsequently inserting the screws and securing the axial position of the housing portion, the attachment of the adapter and in particular the connection of the fluid line are considerably simplified. An exemplary application of the adapter is a low-pressure turbine housing of an aircraft engine, wherein coolant is supplied to the low pressure turbine via an adapter. Of course, the adapter is also intended for the connection of different fluid lines, in particular of a housing of a turbomachine.

In a preferred embodiment, the pairs of flanges are offset or twisted by 90° to each other. This permits a highly reliable connection to be made with a minimum number of flanges.

Preferably, the pairs of flanges extend radially to the channel axis. By this action, the stability of the attachment of the adapter to the housing section and the connection of the pipe connection element of the adapter can be increased.

Preferably, the upper pair of flanges in the region of its lateral feed-throughs has lower stops to create a form-fit connection with a fastener part widened relative to a fastener shaft. The stops thus guard against twisting, so that despite the reduced overall height, mounting of the adapter can be done in a simpler fashion. A tool for holding the fastener is not required. In addition, the stops act as a guard to prevent accidental disengagement of the respective fasteners.

The stops may extend from the wall sections of the upper flange pair. Such stops are easy to execute. For example, they can be milled out of the upper flange pair.

To achieve a tilt-free support of the adapter on the housing section, it is advantageous if the lower pair of flanges protrude in the direction of the channel axis beyond an underside of the fluid channel comprising the core housing. This causes the core housing to be spaced from the housing portion in the mounted state and not form a contact surface, so that the adapter rests on the housing part only via the lower pair of flanges.

The orientation of the adapter to the housing section and the alignment of the piping connection element on the adapter can be simplified, if the feed-throughs are slots extending radially to the channel axis. At the same time, a tolerance compensation to the fastener drill holes in the housing section and in the piping connection element can be made via the slots.

Preferably, the fluid channel has a channel wall, which extends in the direction of the channel axis beyond the contact surfaces of the lower pair of flanges. In this way the fluid channel is introduced into the housing inlet, whereby leakage is avoided or the risk of leakage is reduced.

To reduce weight, the core housing may, with respect to the channel axis, have an upper annular recess and/or a lower ring-shaped recess.

A preferred turbomachine is provided with at least one adapter according to the invention, attached to a housing. In this way, a fluid line connected to the adapter can be guided closely along the housing. Preferably, the adapter is arranged on the housing of a low-pressure compressor and connected to a refrigerant pipe for supplying refrigerant to the low-pressure compressor.

A preferred embodiment of the invention will be explained in more detail with reference to schematic illustrations.

DETAILED DESCRIPTION OF THE DRAWINGS

Figure 1:
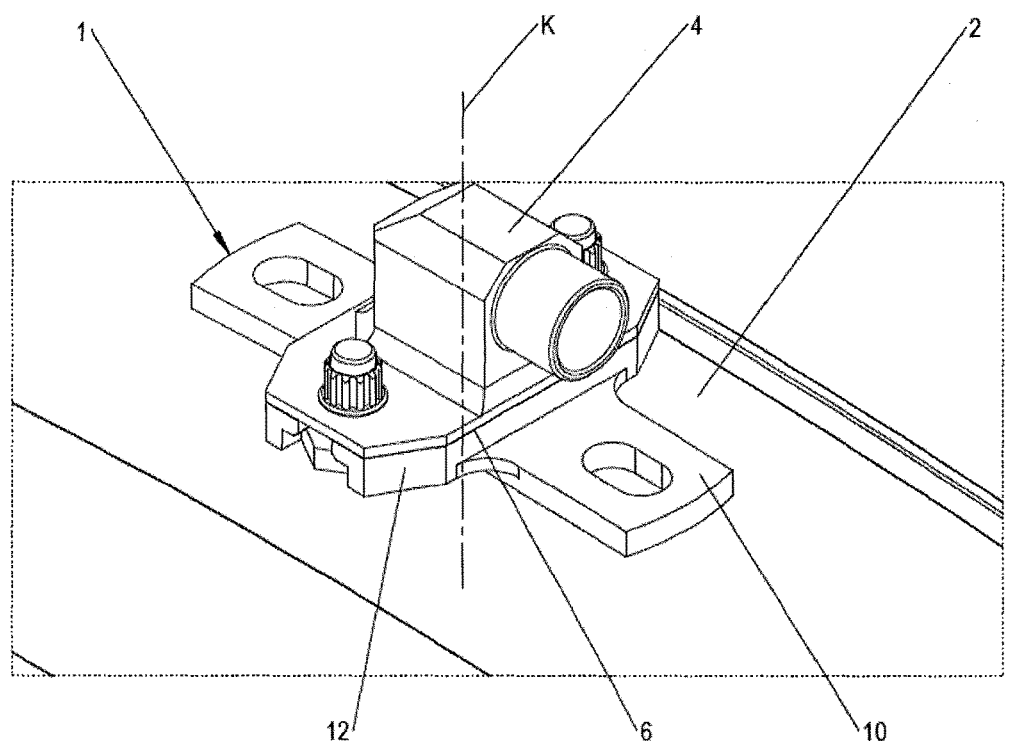
FIG. 1 is a perspective top view of an adapter according to an embodiment of the invention, which is connected to a housing section of a turbomachine and provided with a connecting element of a fluid line.

FIG. 1 shows an embodiment of an adapter 1 of the invention, for connecting a fluid line (not shown) to a housing section 2 of a turbomachine. The fluid line is connected to the adapter 1 via a connecting element 4 arranged to the fluid line. The housing section is, for example, a section of a low-pressure compressor housing and the fluid line is a coolant line for supplying a coolant to the low-pressure compressor. The turbomachine itself is, for example, a gas turbine and in particular an aircraft engine.

The adapter 1 has a cuboid core housing 6, which is traversed by a fluid channel designated in the following figures with reference numeral 8, for establishing fluid communication between the fluid line and a housing inlet of the housing section 2. For reasons of clarity, in FIG. 1 only one longitudinally disposed channel axis K of the fluid channel 8 is shown in FIG. 1. Moreover, the adapter 1 has a lower pair of flanges 10, by means of which it and the core housing 8 are attached to the housing section 2, and an upper pair of flanges 12 to which the lead connection element 4 is connected.

Figure 2:
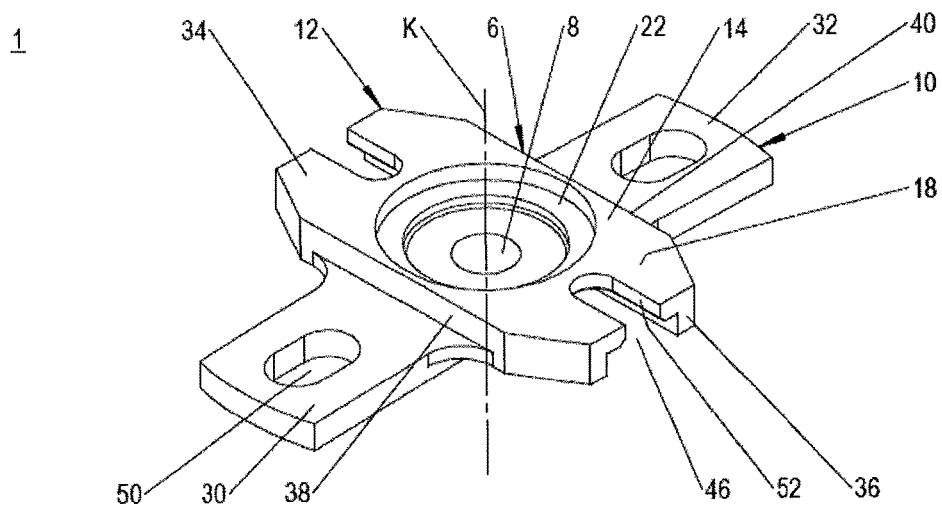
FIG. 2 shows a detail view of the adapter from the bird's-eye perspective.
Figure 3:
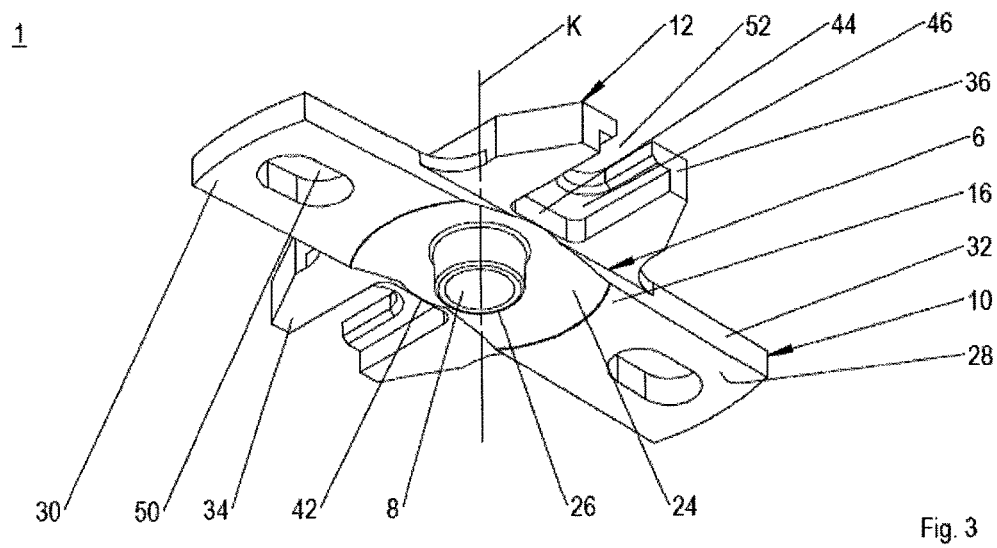
FIG. 3 is a detail view of the adapter from a low angle.

As shown in FIGS. 2 and 3, the fluid channel 8 traverses the core housing 6 from a top side 14 toward an underside 16. The top side 14, with the upper pair of flanges 12, forms a connecting surface 18 for a contact surface 20, numbered in FIG. 5, of piping connection element 4. If the piping connection element 4 has a central body section projecting beyond its contact face 20 or if the core housing 6 has, for example, an annular gasket, not shown, arranged between the connecting surface 18 and the contact surface 20, a corresponding upper annular recess 22 may be introduced into the top side 14. In addition, a lower annular recess 24 can be introduced in the underside 16 for exemplary weight reduction of the adapter 1. In order to reduce leakage in the region between the housing section 2 and the adapter 1, the fluid channel 8 has a channel wall 26, which is led out beyond a contact surface 28 formed by the lower pair of flanges 10 and which in the mounted state is immersed in the housing inlet (see FIG. 4 also).

The pairs of flanges 10, 12 are each arranged offset from each other about the channel axis K by 90°. They have a pair of flanges aligned in the radial direction 30, 32 and 34, 36 which respectively extend from two oppositely facing side surfaces 38, 40 and 42, 44 of the core housing 6, respectively. In the direction of the channel axis K, the pair of flanges 10, 12 is arranged without any distance between each another. As will be explained further in the following, receiving spaces or free spaces 46 for receiving a fastener 48 for connecting the fluid connection element 4 are provided laterally to the lower pair of flanges, whereby the adapter 1 may be formed flat and with a low overall height.

The upper flanges 12 and the upper flanges 34, 36 are flush with the top surface 14 of the core housing 6 and, with this, the shared connecting surface 18 for attaching the piping connection element 4. The connecting surface 18 is geometrically adapted to the contact surface 20 of the piping connection element 4. In the embodiment shown, the connecting surface 18 is formed flat.

Figure 4:
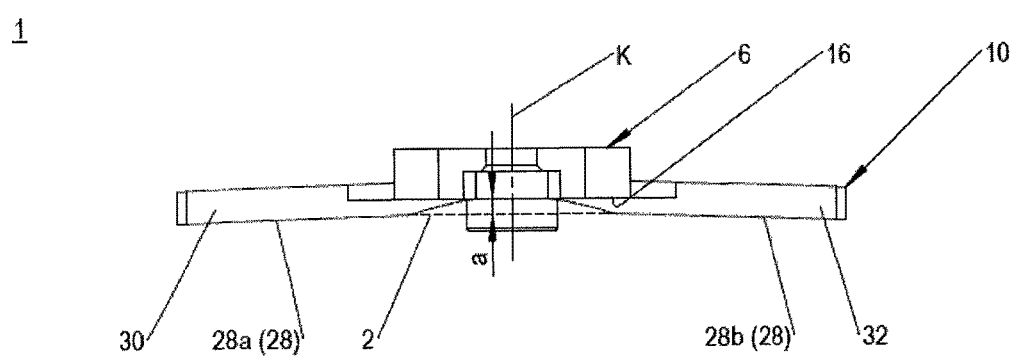
FIG. 4 shows a side view of the adapter.

As shown in FIG. 4, the lower pair of flanges 10 forms, and the lower flanges 30, 32 form, a common contact surface 28, and 28a, 28b, for engagement with the housing section 2. Preferably, the contact surface 28 is geometrically adapted to the housing section in order to improve the contact to the housing section 2. In the illustrated embodiment, the contact surface 28 has a concave curvature that corresponds to a convex curvature of the housing section 2.

In addition to improving the contact of the adapter 1 to the housing section 2, in the embodiment shown, the lower pair of flanges 10 protrudes on the underside 16 of the core housing 6 in the direction of the channel axis K. In this way, the core housing 6 is, in the mounted state, positioned with its underside 16 at a distance "a" from the housing section 2 shown in dashed lines, so that laying of the core housing 6 on the housing section 2 is prevented. In addition, as can be recognized from FIGS. 5 and 6, this spacing makes for easier positioning of the fastener 48.

In accordance with FIGS. 2 and 3, in each flange 30, 32 and 34, 36, one feed-through 50, 52 is formed for receiving one of the fasteners 48. As shown by way of example in FIG. 5, the fastener 48 is preferably in each case a screw, which acts together with corresponding nut 54. For reasons of clarity, the feed-throughs 50, 52 as shown in FIGS. 2 and 3 are only numbered in the left lower flange 30 and the front upper flange 36.

The feed-throughs 50 of the lower pair of flanges 10 are formed as slots extending radially to the channel axis K and thus formed centrally to the flanges 30, 32.

The feed-throughs 52 of the upper pair of flanges 12 are formed as circumferentially open slots, which also extend radially to the channel axis K and thus are formed centrally to the upper flanges 34, 36. Thus, as are the pairs of flanges 10, 12, the upper and lower feed-throughs 50, 52 are also offset by 90° to each other. In the embodiment shown, the upper feed-throughs 52 are, in particular with respect to their front sides, open in the radial direction with respect to the channel axis K.

Figure 5:
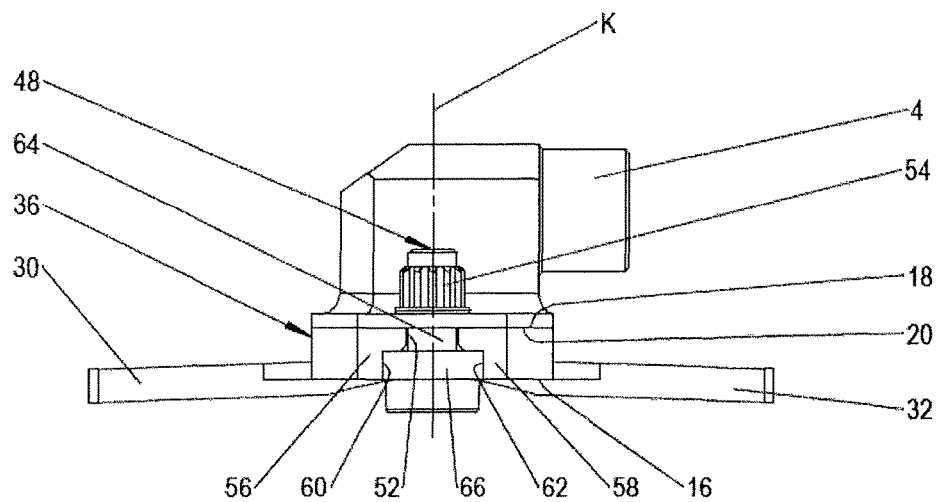
FIG. 5 shows a side view of the adapter with a mounted fluid line connecting element.
Figure 6:
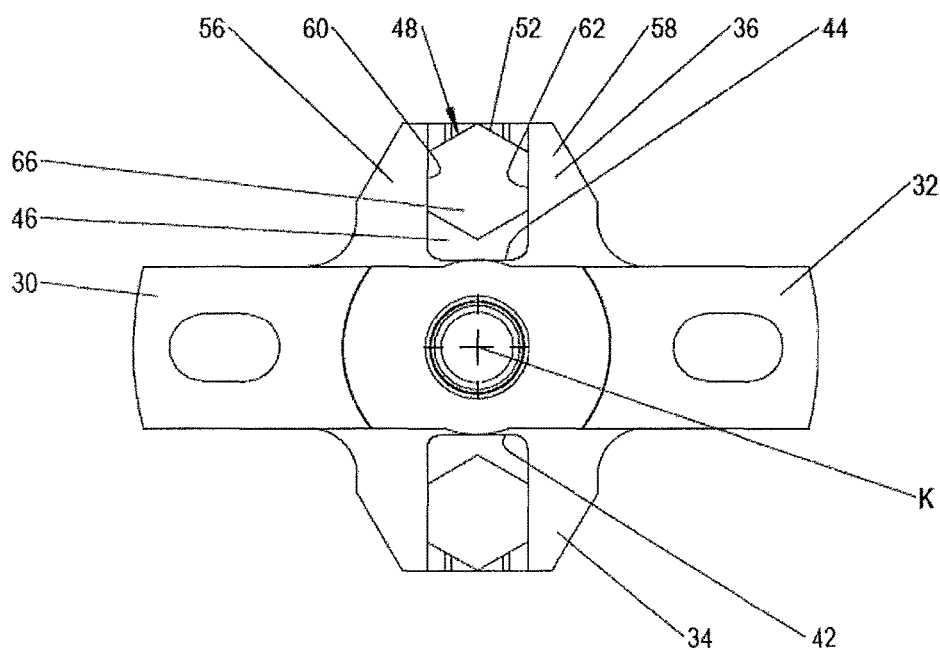
FIG. 6 is a bottom view of the adapter with a mounted fluid line connecting element.

As numbered in FIGS. 5 and 6, the upper flanges 34, 36 each have two wall sections 56, 58 oriented in the direction of the lower pair of flanges 10, which are arranged on both sides of the feed-throughs 52 and have two opposing form-fit surfaces 60, 62. The wall sections 56, 58, with their form-fit surfaces 60, 62, laterally limit the receiving spaces 46. The spacing of the form-fit surfaces 60, 62 is such that between them a fastener head 66 widened relative to a fastener shaft 64 can be arranged almost without clearance.

As shown in FIG. 6, the receiving spaces 46 extend from the side surface 42 or 44 and are open at the end face and at the bottom. They are used to accommodate the fastener head 66, wherein the fastener 48 can be used for the piping connection element 4, after the adapter 1 has been attached to the housing section 2, so that the fluid line can be easily connected to the adapter 1. In the connected state of the piping connection element 4, the fasteners 48 lie with heads 66 laterally flat on the form-fit surfaces 60, 62 and are led upward with their shafts 64 in the direction of the channel axis K. One nut 54 is screwed to each of the free shaft end sections which pass through the feed-throughs 52.

The wall sections 56, 58, and in particular their form-fit surfaces 60, 62, thus act as stops, and in particular as an anti-rotation fixing means for the respective fasteners 48. Preferably, the wall sections 56, 58 do not protrude over the underside 16 of the core housing 6, but extend at most up to it or close flush with it. In this way, the wall sections 56, 58 in the mounted state are also spaced from the housing section 2 by a distance "a" (see FIG. 4). The fastener heads 66, in the embodiment shown, have such a height that they also close flush with the underside 16.

Disclosed is an adapter for connecting a fluid line to a housing section of a turbomachine, in which an upper and a lower pair of flanges are arranged offset to each other about a channel axis and in the direction of the channel axis, the upper flanges being arranged without spacing to the bottom flanges, wherein the feed-throughs of the upper pair of flanges are open circumferentially.

LIST OF REFERENCE CHARACTERS

- 1 adapter
- 2 housing section
- 4 connection element/piping connection element
- 6 core housing
- 8 fluid channel
- 10 lower flange pair
- 12 upper flange pair
- 14 top
- 16 bottom
- 18 connecting surface
- 20 contact surface
- 22 upper annular recess
- 24 lower annular recess
- 26 channel wall
- 28 contact surface
- 30 flange
- 32 flange
- 34 flange
- 36 flange
- 38 side surface
- 40 side surface
- 42 side surface
- 44 side surface
- 46 receiving space
- 48 fastener
- 50 feed-through
- 52 feed-through
- 54 nut
- 56 wall section/stop
- 58 wall section/stop
- 60 form-fit surface
- 62 form-fit surface
- 64 fastener shaft
- 66 fastener head
- a distance
- K channel axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adapter for connecting a fluid line to a housing section of a turbomachine, comprising:
    a core housing with a fluid channel for establishing a fluid communication between the fluid line and a housing inlet;
    a plurality of flanges extending from the core housing, wherein each of the plurality of flanges has a feed-through for passage of a fastener;
    wherein a first two of the plurality of flanges form an only single lower pair of flanges for attachment of the adapter to the housing section and wherein a second two of the plurality of flanges form an only single upper pair of flanges for connecting a connecting element of the fluid line to the adapter;
    wherein the lower and the upper pairs of flanges are arranged offset from each other around a channel axis of the fluid channel by 90° and are arranged without a space between each other in a direction of the channel axis;
    and wherein the feed-throughs of the upper pair of flanges are formed as circumferentially open slots.

2. The adapter according to claim 1, wherein the lower and upper pairs of flanges extend radially to the channel axis.

3. The adapter according to claim 1, wherein each of the upper pair of flanges in a region of the respective feed-throughs has bottom lateral stops for forming a form-fit connection with a respective fastener part that is widened relative to a respective fastener shaft.

4. The adapter according to claim 3, wherein the bottom lateral stops are wall sections respectively extending from the upper pair of flanges.

5. The adapter according to claim 1, wherein the lower pair of flanges protrudes over an underside of the core housing in the direction of the channel axis.

6. The adapter according to claim 1, wherein the feed-throughs are slots extending radially to the channel axis.

7. The adapter according to claim 1, wherein the fluid channel has a channel wall extending in the direction of the channel axis over a contact surface of the lower pair of flanges.

8. The adapter according to claim 1, wherein the core housing, relative to the channel axis, has an upper annular recess and/or a lower annular recess.

9. An adapter for connecting a fluid line to a housing section of a turbomachine, comprising:
    a core housing with a fluid channel;
    an only single lower pair of flanges and an only single upper pair of flanges extending from the core housing, wherein each of the flanges of the lower pair of flanges and the upper pair of flanges has a feed-through;
    wherein the lower and the upper pairs of flanges are arranged offset from each other around a channel axis of the fluid channel by 90° and are arranged without a space between each other in a direction of the channel axis;
    and wherein the feed-throughs of the upper pair of flanges are formed as circumferentially open slots.

* * * * *